United States Patent
Sonkar et al.

(10) Patent No.: US 10,719,597 B2
(45) Date of Patent: Jul. 21, 2020

(54) AUTHORIZATION OF VIRTUAL REALITY INTERACTIONS USING CONTROLLED RANDOMIZATION

(71) Applicant: Visa International Service Association, San Francisco, CA (US)

(72) Inventors: Siddhant Sonkar, Uttar Pradesh (IN); Sumiran Aggarwal, Uttar Pradesh (IN); Venkata Krishna Prasad Akkapeddi, Telangana (IN); Prateek Khare, Bhopal (IN); Mohit Choudhary, Maharashtra (IN)

(73) Assignee: Visa International Service Association, San Francisco, CA (US)

( * ) Notice: Subject to any disclaimer, the term of this patent is extended or adjusted under 35 U.S.C. 154(b) by 260 days.

(21) Appl. No.: 15/479,096

(22) Filed: Apr. 4, 2017

(65) Prior Publication Data
US 2018/0285549 A1  Oct. 4, 2018

(51) Int. Cl.
*G06F 21/36* (2013.01)
*H04L 29/06* (2006.01)
(Continued)

(52) U.S. Cl.
CPC ......... *G06F 21/36* (2013.01); *G06Q 20/4012* (2013.01); *G06Q 20/40145* (2013.01);
(Continued)

(58) Field of Classification Search
CPC .. G06F 21/36; G06Q 20/4018; G06Q 20/385; G06Q 20/4012; G06Q 20/40145;
(Continued)

(56) References Cited

U.S. PATENT DOCUMENTS 6,209,104 B1  3/2001  Jalili
6,397,198 B1  5/2002  Hoffman et al.
(Continued)

FOREIGN PATENT DOCUMENTS

WO   2016-069451 A1   5/2016

OTHER PUBLICATIONS

International Search Report and Written Opinion dated Jul. 12, 2018 for PCT/US2018/024384, 13 pages.

*Primary Examiner* — Jeffrey D. Popham
(74) *Attorney, Agent, or Firm* — Kilpatrick Townsend & Stockton LLP

(57) ABSTRACT

Embodiments of the disclosure are directed to the use of controlled randomization in authorizing virtual reality interactions. More specifically, a user of a virtual reality (VR) device may seek to initiate an interaction within the virtual reality environment. In order for the interaction to be allowed for the user, a processing computer may need the user to supply an additional credential. In some cases, the user may enter the additional credential using a series of virtual keypads that are rendered in the virtual reality environment. These keypads may have varying layouts that are determined in a controlled manner (e.g., pseudo-randomly) using pre-determined mathematical procedures. The layout of a subsequent keypad may be partially based on the user's selection in a preceding keypad. The keypad positions for the user's selections may be provided to the processing computer to solve for the credential which can be used for validation purposes.

17 Claims, 6 Drawing Sheets

(51) Int. Cl.
*G06Q 20/40* (2012.01)
*G09C 5/00* (2006.01)
*H04L 9/32* (2006.01)

(52) U.S. Cl.
CPC .............. *G09C 5/00* (2013.01); *H04L 9/3226* (2013.01); *H04L 63/0884* (2013.01)

(58) Field of Classification Search
CPC ..... H04L 63/0884; H04L 9/30; H04L 9/3226; G09C 5/00
See application file for complete search history.

(56) References Cited

U.S. PATENT DOCUMENTS

| | | | |
|---|---|---|---|
| 7,596,701 | B2 | 9/2009 | Varghese et al. |
| 8,176,324 | B1 * | 5/2012 | Krishnamurthy ..... G06F 3/0236 380/45 |
| 8,347,103 | B2 | 1/2013 | Jones et al. |
| 2012/0246079 | A1 | 9/2012 | Wilson et al. |
| 2015/0134526 | A1 | 5/2015 | Russell |
| 2015/0235024 | A1 * | 8/2015 | Corrion ................... G06F 21/31 726/18 |
| 2016/0065562 | A1 | 3/2016 | Guo |
| 2016/0105798 | A1 | 4/2016 | Paima |
| 2016/0117510 | A1 * | 4/2016 | Yi ........................... G06F 21/31 713/189 |
| 2016/0125411 | A1 * | 5/2016 | Briggs ............... G06Q 20/4012 726/4 |
| 2016/0307001 | A1 * | 10/2016 | Dow ....................... G06F 21/83 |
| 2017/0324726 | A1 * | 11/2017 | Alleaume ............... G06F 21/35 |

\* cited by examiner

AUTHORIZATION OF VIRTUAL REALITY INTERACTIONS USING CONTROLLED RANDOMIZATION

FIELD

Methods and systems disclosed herein relate generally to computer security and authentication. More specifically, the methods and systems disclosed herein can be used to improve security when authorizing virtual reality interactions between a user and a virtual reality environment displayed by a virtual reality device. Virtual keypads can be generated using controlled randomization methods and displayed in the virtual reality environment, which may allow the user to provide a credential necessary to authorize the interaction through the virtual reality device while remaining engaged to the virtual reality environment. This may be particularly effective against man-in-the-middle attacks, observers who may be able to deduce the credential from observing the user's inputs, and other instances of fraud.

BACKGROUND

Virtual reality devices are becoming increasing popular in today's technological environment, and they can offer a higher level of user engagement than tradition computing devices. These virtual reality devices can be used to render a virtual reality environment that a user may interact with in various ways. In particular, a user may interact with the virtual reality environment in order to achieve specific tasks or obtain specific resources within that virtual reality environment. For example, a user may seek access to a restricted area in the virtual reality environment or may look to purchase a virtual good or service within the virtual reality environment. Before these things are provided to the user to interact with, the interaction may first need to be authorized.

In order to complete the authorization process, the user may need to provide specific credentials (e.g., a username and password, a PIN number, and so forth). Such credentials are usually required by various computer systems in order to authorize a user. However, the theft of these credentials can be a great concern. For instance, if a user's credentials are stolen by another user, that other user may be able to perform fraudulent interactions within a virtual reality environment using the stolen credentials.

In the case of virtual reality devices, the manner in which a user furnishes credentials may open up the possibility for fraud. In particular, there could be observers in the same room as the device user who may be able to see the user entering the credential or deduce the credential based on the user's actions. For example, a virtual reality device may allow a user to provide input based on the user's eye movements or head movements, and an observer may be able to deduce those inputs based on the user's eye movements or head movements. As an alternative, more secure methods of having users furnish credentials may be used, but at the potential cost of reducing the user's engagement with the virtual reality environment. For example, having a user enter the credential using a separate device (e.g., computer or phone) would mean the user is no longer immersed in the virtual reality environment.

Accordingly, there exists a need for a secure method of using a virtual reality device to obtain user credentials without requiring the user disengage from the virtual reality environment (e.g., allowing the user to initiate interactions without breaking immersion).

Embodiments of the invention address this and other problems, individually and collectively.

BRIEF SUMMARY

Embodiments of the disclosure are directed to the use of controlled randomization in authorizing virtual reality interactions. More specifically, a user of a virtual reality (VR) device may seek to initiate an interaction within the virtual reality environment. In order for the interaction to be allowed for the user, a processing computer may need the user to supply an additional credential. In some cases, the user may enter the additional credential using a series of virtual keypads that are rendered in the virtual reality environment. These keypads may have varying layouts that are determined in a controlled manner (e.g., pseudo-randomly) using pre-determined mathematical procedures. The layout of a subsequent keypad may be partially based on the user's selection in a preceding keypad. The keypad positions for the user's selections may be provided to the processing computer to solve for the credential which can be used for validation purposes.

In some embodiments of the present disclosure, a computer-implemented method is disclosed in which a virtual reality device receives a seed value. The virtual reality device may use this seed value to generate a first keypad layout based on the seed value, and the virtual reality device may display, to a user of the virtual reality device, a first keypad in a display of the virtual reality device. This first keypad may have the first keypad layout generated based on the seed value. The virtual reality device may receive a user selection from the user of a first key at a first position of the first keypad. Using the first position, the virtual reality device may then generate a second keypad layout based on the first position, with the second keypad layout having keys in positions that are different than the keys in the first keypad layout. The virtual reality device may then generate and display to the user of the virtual reality device a second keypad with the second keypad layout in place of the first keypad in the display of the virtual reality device. Similarly, the virtual reality device may receive a user selection from the user of a second key at a second position of the second keypad. The virtual reality device may transmit a position string to a processing computer, with the position string indicating both the first position and the second position. The processing computer can then use the information in the position string to validate the user of the virtual reality device. In some cases, the seed value used by the virtual reality device may be received from the processing computer. In some cases, the virtual reality device and the processing computer may each have a data processor, and a computer readable medium with a keypad layout generation module. In some cases, the seed value used by the virtual reality device is a public encryption key associated with the processing computer. In some cases, the virtual reality device may generate the first keypad layout by using the seed value as an initial input for a function to produce a pseudo-random result. In some cases, the virtual reality device may generate the second keypad layout by using the first position as an input for a function to produce a pseudo-random result. In some cases, the first keypad generated by the virtual reality device may have nine keys. In some cases, the second keypad generated by the virtual reality device may have nine keys.

In some embodiments of the present disclosure, a virtual reality device is disclosed that has one or more processors, a display, and a non-transitory computer readable medium storing one or more program instructions executable on the one or more processors. Executing the one or more program instructions may result in the one or more processors performing numerous tasks. For example, the virtual reality device may receive a seed value and generate a first keypad layout based on the seed value. The virtual reality device may then display a first keypad in the display, with the first keypad having the first keypad layout. The virtual reality device may receive a user selection from a user of a first key at a first position of the first keypad. The virtual reality device may generate a second keypad layout based on the first position, with the second keypad layout having keys in positions that are different than the keys in the first keypad layout. The virtual reality device may display a second keypad in place of the first keypad in the display, with the second keypad having the second keypad layout. The virtual reality device may receive a user selection of a second key at a second position of the second keypad. The virtual reality device may then transmit a position string to a processing computer. This position string may indicate the first and the second position, and it may be usable by the processing computer to validate the user. In some cases, the seed value received by the virtual reality device is from the processing computer. In some cases, the processing computer may include a data processor, and a computer readable medium with a keypad layout generation module. In some cases, the seed value is a public encryption key associated with the processing computer. In some cases, the virtual reality device may generate a first keypad layout using the seed value as an initial input for a function to produce a pseudo-random result. In some cases, the virtual reality device may generate the second keypad layout using the first position as an input for a function to produce a pseudo-random result. In some cases, the first keypad generated by the virtual reality device may have nine keys. In some cases, the second keypad generated by the virtual reality device may have nine keys.

In some embodiments of the present disclosure, a computer-implemented method is disclosed in which a processing computer sends a seed value. The processing computer may then receive a position string indicating a first position and a second position. The first position may correspond to a user selection of a first key of a first keypad having a first keypad layout based on the seed value. The second position may correspond to a user selection of a second key of a second keypad having a second keypad layout based on the first position. The processing computer may then generate a first server keypad layout based on the seed value. The processing computer may evaluate a first digit of a PIN number based on the first position and the first server keypad layout. The processing computer may generate a second server keypad layout based on the first position. The processing computer may evaluate a second digit of the PIN number based on the second position and the second server keypad layout. Once the processing computer knows the digits of the PIN number, it can compare the PIN number to a reference PIN number. In some cases, the processing computer may determine a verification status based on the comparison of the PIN number to the reference PIN number. In some cases, the seed value is a public encryption key associated with the processing computer. In some cases, the processing computer may generate the first server keypad layout using the seed value as an initial input for a function to produce a pseudo-random result. In some cases, the processing computer may generate the second server keypad layout using the first position as an input for a function to produce a pseudo-random result.

DETAILED DESCRIPTION

Introduction

Figure 1:
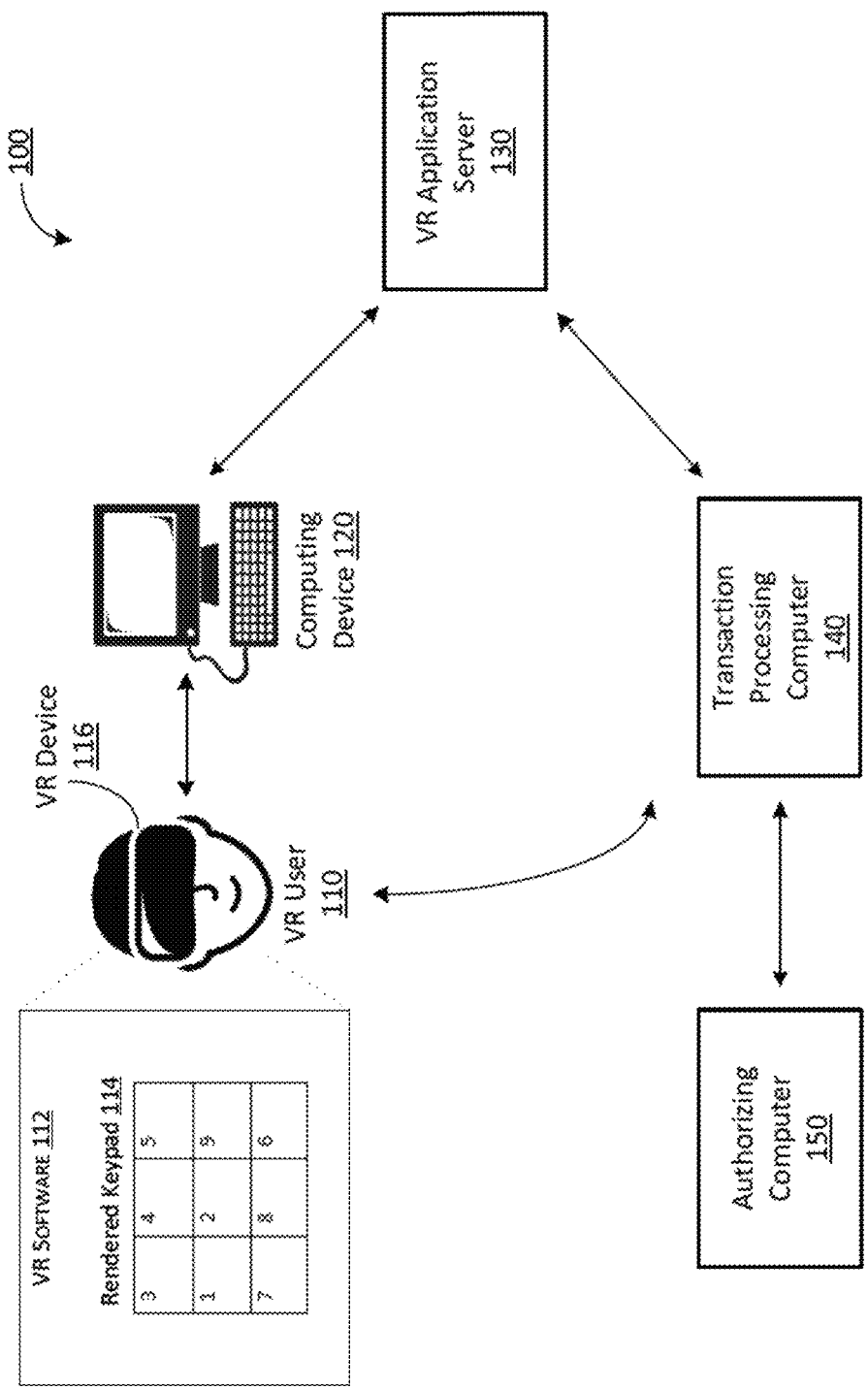
FIG. 1 shows a block diagram of an authorization system according to embodiments of the invention.

As previously discussed, a user of a virtual reality device may interact with a virtual reality environment in a number of ways. The user may seek to achieve specific tasks or obtain specific resources within that virtual reality environment, such as virtual access, virtual goods, or virtual services. For example, there could be a virtual reality environment that is a virtual art marketplace, with paintings for sale. The paintings can be rendered and displayed in 3-D to the user via the display of the virtual reality device, so that the user can inspect the paintings in great detail. At some point, the user may wish to add a specific painting to his/her collection and initiate an interaction with the environment (in this case, start a transaction) to acquire that painting. As another example, the virtual reality environment could be a virtual reality game. The user may wish to obtain an in-game object, such as a gun for his/her avatar within the virtual reality environment. The user may initiate an interaction in the virtual reality environment (e.g., initiate a micro-transaction) in order to acquire that in-game object.

In order for the user to obtain what they are seeking, the user may have to furnish an additional credential. The user may be able to enter that credential within the virtual reality environment itself, such that the user can complete the interaction without having to disengage from the virtual reality environment. For example, a keypad could be rendered in the virtual reality environment that the user could see using the virtual reality device. The user could enter the credential (e.g., passcode, PIN number) using this virtual keypad without having to look away from the virtual reality device.

In some cases, the virtual reality device may be worn on the user's head and it may have various sensors, such as gyroscopes and cameras, that allow for tracking the user's head movements and eye movements. In such cases, the user may be able to enter a credential through head or eye movements. For example, the user could select keys one-by-one in the virtual keypad by focusing or looking at the individual keys in the virtual keypad. The user's focusing action can be registered by tracking the user's head movement via gyroscopes (e.g., in a mobile device) or cameras (e.g., in the case of a HTC Vive™ headset), or by tracking the user's eyes via eye-facing cameras (e.g., in the case of FOVE™ VR headset). This allows the user to perform interactions without breaking immersion in the virtual reality environment, allowing the interactions to be completed quickly, conveniently, and with the least disturbance to the user's virtual reality experience. It also improves compatibility with VR software (allowing this method to be used with Virtual Stores and for micro-transactions of virtual goods in games).

However, there still remains the issue of security. An observer in the same room as a user may be able to deduce those inputs based on the user's eye movements or head movements. In other words, an observer may be able to guess the user's selections on a virtual keypad based on the direction of the user's head movements. To deal with this issue, virtual keypads can be generated with randomized layouts or grids, such that it would be difficult for an observer to guess the user's selections in the keypad via head movements. In some embodiments, additional security may be provided by generating multiple virtual keypads that each have a different, randomized layout. Each keypad may be used to receive the selection of a single key. In other words, from the user's perspective there may be a single keypad and the positions of the numbers (or letters) in the keypad may change with each selection by the user. This makes it exceedingly difficult for an observer to guess the user's credential since the keypad layout is continuously changing.

In some embodiments, a user may be able to make a keypad selection by focusing on a key in the keypad. The key (or number) being focused on may change color to indicate to the user the current point of focus. The user may be able to move their head or eyes to a different key to focus and select another key. The user may be able to input a selection by retaining focus on a key for a long enough period of time, or through a trigger event such as a button tap, a blink/double-blink, and so forth. Once the user finishes making the selections to enter the credential, the credential can be transmitted in order to complete the interaction.

Prior to discussing the details of some embodiments of the present invention, description of some terms may be helpful in understanding the various embodiments.

A "VR device" may comprise any device that may be used by a user to view and access a virtual reality environment. A VR device may comprise of elements such as a display, a processor, a memory, an input device, and a network interface. In some cases, a user may wear a VR device (e.g., over their eyes), while in other cases the VR device may be configured to display a virtual reality environment without the user having to wear the VR device (e.g., the VR device may project a virtual reality environment on a screen or the walls of a room that the user is in).

A "VR software" may comprise any software being executed on a VR device. In some cases, the VR software may be an operating system associated with the VR device. The VR software may be tasked with generating a virtual reality environment that is displayed to the user and may be interacted with by the user.

A "computing device" may comprise any electronic device. In some embodiments, the computing device may have remote communication capabilities to a network. Examples of remote communication capabilities include using a mobile phone (wireless) network, wireless data network (e.g., 3G, 4G or similar networks), Wi-Fi, Wi-Max, or any other communication medium that may provide access to a network such as the Internet or a private network. In some cases, a VR device may be communicatively coupled to the computing device (e.g., through a cable), while other cases the VR device and the computing device are the same unit. Examples of computing devices include mobile phones (e.g., cellular phones), PDAs, tablet computers, net books, personal or desktop computers, laptop computers, personal music players, hand-held specialized readers, wearable devices (e.g., watches, glasses, lenses, tattoos, clothing, etc.), etc. A computing device may comprise any suitable hardware and software for performing such functions, and may also include multiple devices or components (e.g., when a device has remote access to a network by tethering to another device—i.e., using the other device as a relay—both devices taken together may be considered a single mobile device).

A "VR application server" may comprise a variety of computing structures, arrangements, and compilations for servicing requests from one or more VR devices and/or computing devices. In some embodiments, the VR application server may belong to a "resource provider", which may be an entity that can provide a virtualized interaction or resource (e.g., such as goods, services, information, and/or access with the virtual reality environment). Examples of a resource provider includes merchants, game companies, data providers such as government agencies, etc. A "merchant" may typically be an entity that engages in transactions and can sell virtualized goods or services, or provide access to virtualized goods or services. In some cases, the VR Application Server may be referred to as a "resource provider computer" (e.g., a computer operated by a resource provider).

A "processor" may refer to any suitable data computation device or devices. A processor may comprise one or more microprocessors working together to accomplish a desired function. The processor may include CPU comprises at least one high-speed data processor adequate to execute program components for executing user and/or system-generated requests. The CPU may be a microprocessor such as AMD's Athlon, Duron and/or Opteron; IBM and/or Motorola's PowerPC; IBM's and Sony's Cell processor; Intel's Celeron, Itanium, Pentium, Xeon, and/or XScale; and/or the like processor(s).

A "memory" may be any suitable device or devices that can store electronic data. A suitable memory may comprise a non-transitory computer readable medium that stores instructions that can be executed by a processor to implement a desired method. Examples of memories may comprise one or more memory chips, disk drives, etc. Such memories may operate using any suitable electrical, optical, and/or magnetic mode of operation.

An "application" may be computer code or other data stored on a computer readable medium (e.g. memory element or secure element) that may be executable by a processor to complete a task.

An "authorization request message" may be an electronic message that is sent to request authorization for an interaction. The authorization request message can be sent to a payment processing network and/or an issuer of a payment card. An authorization request message according to some embodiments may comply with ISO 8583, which is a standard for systems that exchange electronic transaction information associated with a payment made by a user using a payment device or payment account. Other standard message formats may include ISO 20022 as well as blockchain message format. The authorization request message may include information that can be used to identify an account (e.g., information for a token). An authorization request message may also comprise additional data elements such as one or more of a service code, an expiration date, etc. An authorization request message may also comprise transaction information, such as any information associated with a current transaction, such as an identification of the virtual good or service, a transaction amount, a merchant identifier, a merchant location, etc., as well as any other information that may be utilized in determining whether to identify and/or authorize a transaction. The authorization request message may also include other information such as information that identifies VR device and/or computing device that generated the authorization request message, information about the location of the VR device and/or computing device, etc.

An "authorization response message" may be an electronic message reply to an authorization request message. The authorization response message can be generated by an issuing financial institution or a payment processing network. The authorization response message may include, by way of example only, one or more of the following status indicators: Approval—transaction was approved; Decline—transaction was not approved; or Call Center—response pending more information, merchant must call the toll-free authorization phone number. The authorization response message may also include an authorization code, which may be a code that a credit card issuing bank returns in response to an authorization request message in an electronic message (either directly or through the payment processing network) to the merchant computer that indicates approval of the transaction. The code may serve as proof of authorization.

An "API message" may be a formatted message that facilitates communications between system components according to an application programming interface or API. The API message may allow system components to share data and initiate actions on each other's behalf. For example, an API message may comprise transaction data that may initiate a server computer to return a response based on the transaction data.

An "application programming interface" or "API" may be a set of routines, protocols, and tools that specify how system components should interact. The API may allow various components of a system to generate, send, and receive to and from each other in a recognizable format. The API may be preconfigured, installed, or programmed onto a device, and may instruct the device to perform specified operations and networking commands. The API may allow for the request of services by initiating calls to specific instructions or code stored in an application.

A "credential" may be any suitable information that serves as reliable evidence of worth, ownership, identity, or authority. A credential may be a string of numbers, letters, or any other suitable characters, as well as any object or document that can serve as confirmation. Examples of credentials include value credentials, identification cards, certified documents, access cards, passcodes and other login information, etc.

A "value credential" may be information associated with worth. Examples of value credentials include payment credentials, coupon identifiers, information needed to obtain a promotional offer, etc.

A "payment credential" may include any suitable credential that can be used to conduct a payment transaction. Such information may be directly related to the account or may be derived from information related to the account. Examples of account information may include a PAN (primary account number or "account number"), user name, expiration date, CVV (card verification value), dCVV (dynamic card verification value), CVV2 (card verification value 2), CVC3 card verification values, etc.

A "token" may be a substitute value for a credential. A token may be a string of numbers, letters, or any other suitable characters. Examples of tokens include payment tokens, access tokens, personal identification tokens, etc.

A "payment token" may include an identifier for a payment account that is a substitute for an account identifier, such as a primary account number (PAN) and/or an expiration date. For example, a token may include a series of alphanumeric characters that may be used as a substitute for an original account identifier. For example, a token "4900 0000 0000 0001" may be used in place of a PAN "4147 0900 0000 1234." In some embodiments, a token may be "format preserving" and may have a numeric format that conforms to the account identifiers used in existing transaction processing networks (e.g., ISO 8583 financial transaction message format). In some embodiments, a token may be used in place of a PAN to initiate, authorize, settle or resolve a payment transaction or represent the original credential in other systems where the original credential would typically be provided. In some embodiments, a token value may be generated such that the recovery of the original PAN or other account identifier from the token value may not be computationally derived. Further, in some embodiments, the token format may be configured to allow the entity receiving the token to identify it as a token and recognize the entity that issued the token.

"Tokenization" is a process by which data is replaced with substitute data. For example, a payment account identifier (e.g., a primary account number (PAN)) may be tokenized by replacing the primary account identifier with a substitute number (e.g. a token) that may be associated with the payment account identifier.

An "authorizing entity" may be an entity that authorizes a request. Examples of an authorizing entity may be an issuer, a governmental agency, a document repository, an access administrator, etc. An authorizing entity may operate an authorization computer. An "issuer" may refer to a business entity (e.g., a bank) that issues and optionally maintains an account for a user. An issuer may also issue payment credentials stored on a user device, such as a cellular telephone, smart card, tablet, or laptop to the consumer.

An "account identifier" may include an identifier for an account. An account identifier may include an original account identifier associated with a payment account. The account identifier may be in any suitable form and may include any suitable types of characters. Examples of account identifiers include PANs (primary account numbers), tokens, verification values such as CVVs, etc. For example, a real account identifier may be a primary account number (PAN) issued by an issuer for a card account (e.g., credit card, debit card, etc.). For instance, in some embodiments, a real account identifier may include a sixteen digit numerical value such as "4147 0900 0000 1234." The first six digits of the real account identifier (e.g., "414709"), may represent a real issuer identifier (BIN) that may identify an issuer associated with the real account identifier.

A "resource provider identifier" can include any suitable type of information that can identify a resource provider or a location of a resource provider. Examples of resource provider identifiers may include a software ID, merchant ID, a store ID, a device ID of a device at a resource provider location, etc.

Figures

FIG. 1 shows a block diagram of an authorization system according to embodiments of the invention.

In some embodiments, the system 100 may comprise a Virtual Reality (VR) user 110 and a VR device 116. As shown in the figure, the VR user 110 (e.g., a human being)

may operate the VR device 116. Unless specifically mentioned otherwise, any references herein to the VR user 110 may be applicable to the VR device 116, any references to the VR device 116 may be applicable to the VR user 110, and any references to either the VR user 110 or the VR device 116 may be applicable and directed to the combination of the VR device 116 and the VR user 110.

In some embodiments, the VR device 116 may be worn by the user (e.g., the VR device 116 may be a headset that the VR user 110 wears on their head so that a display of the VR device 116 is positioned over the user's eyes). In other embodiments, the VR Device 116 may be configured to create a virtual reality environment without the VR user 110 having to wear the VR device 116 (e.g., the VR device 116 may project a virtual reality environment on a screen or the walls of a room that the user is in).

In some embodiments, the system 100 may comprise a computing device 120. However, the computing device 120 may be optional and absent in other embodiments. The VR device 116 may be communicatively coupled to the computing device 120. For example, the VR device 116 worn by the VR user 110 may be communicative coupled with the computing device 120, and the computing device 120 may assist in processing the virtual reality environment that is rendered through the VR device 116. Some non-limiting examples of the computing device 120 include personal or desktop computers, laptops or tablets, mobile devices (e.g., smart phones), and so forth.

In some embodiments, the computing device 120 and/or the VR device 116 worn by the VR user 110 may be configured to execute the VR software 112, which may cause a virtual reality environment to be rendered and displayed through the VR device 116 for the user. The VR user 110 may be able to perform interactions with the virtual reality environment (e.g., access areas in the virtual reality environment, interact with objects in the virtual reality environment, perform a transaction within the virtual reality environment, and so forth). For example, the VR software 112 may be a game application and the virtual reality environment may include virtualized merchants selling virtualized goods or services. The VR user 110 may interact with those merchants in the virtual reality environment and attempt to purchases those virtualized goods or services. This may initiate a transaction and an authorization process for that transaction. As will be explained herein, during the authorization process a rendered keypad 114 may be generated and displayed to the VR user 110 through the display of the VR device 116.

In some embodiments, the system 100 may comprise a VR application server 130. The VR application server 130 may be configured to perform backend processing and networking for the VR software 112 being run on the computing device 120 and/or the VR device 116. This may be useful in instances in which the VR software 112 is designed with online or connected functionality. For example, the VR software 112 may be configured to allow a VR user 110 to interact with other users that are simultaneously accessing the virtual reality environment of the VR software 112 (rather than, for example, restricting the user to a static, offline virtual reality environment). In such cases, the VR application server 130 may manage interactions among the various connected users, manage any changes occurring in this common virtual reality environment, manage some of the interactions between a user and the common virtual reality environment, and so forth.

As previously alluded to, the VR software 112 may be configured to allow an user to perform an interaction within the VR software 112 (e.g., interact with the virtual reality environment of the VR software 112). In some cases, the user may perform these interactions in order to achieve specific tasks or obtain specific resources. For example, a user may seek to gain access to a restricted area of the virtual reality environment, make a transaction or purchase within the virtual reality environment, inquire for sensitivity information, and so forth. In order to perform these interactions, the user may need to supply specific credentials (e.g., username, password, account identifiers, tokens, PIN numbers, and so forth). In some embodiments, the user may supply these credentials within the virtual reality environment of the VR software 112, such that the user is continually engaged with the virtual reality environment. In some embodiments, some of these credentials may be saved (e.g., like a cookie) by the VR software 112, VR device 116, and/or the computing device 120 and retrieved for use during the transaction process without needing the VR user 110 to furnish them during the transaction process.

In some embodiments, the VR user 110 may initiate an interaction (e.g., a transaction) within the virtual reality environment of the VR software 112. Upon initiating the interaction, the VR device 116 and/or the computing device 120 may send a communication to the VR application server 130. In some embodiments, this communication may be an authorization request message that includes one or more credentials associated with the VR user 110, as well as any relevant transaction data (e.g., an identifier of the virtual good being purchased). For example, the VR user 110 may initiate a virtualized transaction for item A in the virtual reality environment. The VR software 112, VR device 116, and/or computing device 120 may remember an account identifier associated with the user (e.g., from a previous interaction) and supply this account identifier for the communication when the user is looking to perform an interaction. In various embodiments, the credentials of the VR user 110 may be stored on the VR device 116 and/or the computing device 120 in the form of a token or an account identifier that identifies an account of the VR user 110. One example of an account identifier may be a primary account number (PAN). According to embodiments of the invention, the VR device 116 and/or the computing device 120 may transmit credentials instantly to the VR application server 130 after establishing a connection or initiating the transaction. In this specific example, the communication could also include an indication that the transaction is for item A, an attribute associated with the transaction (e.g., the cost or the amount of item A), and so forth. This authorization request message may be received by the VR application server 130 and forwarded to the transaction processing computer 140.

Alternatively, in some embodiments, this information may be provided to the VR application server 130, and it is the VR application server 130 that generates the authorization request message. The VR application server 130 may generate the authorization request message using the received credentials and send it to a transaction processing computer 140. Similarly as before, the authorization request message may comprise the credentials or account identifier associated with VR user 110, as well as information identifying the VR software 112, the transaction details (e.g., the cost), the VR application server 130, and so forth. In some embodiments, the authorization request message may comprise the credentials or account identifier of VR user 110 and a resource provider identifier identifying the resource provider (e.g., entity associated with the VR application server 130) or the VR application server 130. For example, the resource provider identifier may be a merchant ID identifying computers and systems of a merchant that conducts transactions with users. Thus, the VR application server 130 may be configured to generate and send authorization request messages that includes specific information and details pertaining to the interaction that the VR user 110 has with the virtual reality environment.

In some embodiments, the VR application server 130 may first check or validate the interaction before the authorization request message is generated and/or forwarded to the transaction processing computer 140. For example, the VR application server 130 may determine whether a transaction is valid based on its knowledge of the virtual reality environment. As a more specific example, if the VR user 110 is seeking to purchase a virtual item in the virtual reality environment that no longer exists (or is restricted to that specific VR user 110), the VR application server 130 can determine that the transaction is not valid based on the transaction details and account identifier it receives. In some cases, this information may be in an authorization request message that the VR application server 130 analyzes (e.g., the VR application server 130 may analyze the relevant transaction data within the authorization request message). Additional examples of information considered by the VR application server 130 may include the requested item or service, the user's account, any transaction settings/privileges associated with the user's account, and so forth.

In some embodiments, the VR application server 130 may first check or validate the interaction before the authorization request message is generated and/or forwarded to the transaction processing computer 140. For example, the VR application server 130 may determine whether a transaction is valid based on its knowledge of the virtual reality environment. As a more specific example, if the VR user 110 is seeking to purchase a virtual item in the virtual reality environment that no longer exists (or is restricted to that specific VR user 110), the VR application server 130 can determine that the transaction is not valid based on the transaction details and account identifier it receives. In some cases, this information may be in an authorization request message that the VR application server 130 analyzes (e.g., the VR application server 130 may analyze the relevant transaction data within the authorization request message). Additional examples of information considered by the VR application server 130 may include the requested item or service, the user's account, any transaction settings/privileges associated with the user's account, and so forth.

If the VR application server 130 decides not to continue with the transaction, no authorization request message 130 may be forwarded to the transaction processing computer 140. Instead, the VR application server 130 may communicate this decision to the VR device 116 and/or the computing device 120, and a notification may be presented to the VR user 110 within the virtual reality environment that the transaction was unsuccessful. If however, the VR application server 130 decides to continue with the transaction, it may generate and/or forward the authorization request message to the transaction processing computer 140.

The transaction processing computer 140 may be any computer or server computer for processing transactions according to embodiments of the invention. For example, the transaction processing computer 140 may be a computer of a payment processing network, such as VisaNet, and may be configured to receive, read, analyze, store, and retrieve transaction data as well as determine appropriate actions based on predetermined logic. In one embodiment, the transaction processing computer 140 may read the information stored in the received authorization request message (e.g., the credentials for the VR user 110 or the relevant transaction data) and may analyze that information in order to determine whether to continue with the authorization process.

In some embodiments, the transaction processing computer 140 may need an additional credential from the VR user 110 (e.g., a PIN number known by the VR user 110). The transaction processing computer 140 may send a seed value (e.g., a public encryption key) back to the VR device 116 and/or the computing device 120 that can be used by the VR device 116 to generate a pseudo-random layout for a first keypad in a series of keypads. The VR user 110 may provide their PIN number using these keypads and the VR device 116 may monitor the series of user's selections for those keypads. In some embodiments, a user may be able to make a keypad selection by focusing on a key in the keypad. The key (or number) being focused on may change color to indicate to the user the current point of focus. The user may be able to move their head or eyes to a different key to focus and select another key. The user may be able to input a selection by retaining focus on a key for a long enough period of time, or through a trigger event such as a button tap, a blink/double-blink, and so forth.

In some embodiments, the VR device 116 and/or the computing device 120 may send a position string back to the transaction processing computer 140, and the position string may provide an indication of the positions corresponding to the user's selections on each of the keypads. These positions can be used by the transaction processing computer 140 to determine the PIN entered by the VR user 110, which can be validated by comparing it to a reference PIN that is on-file for the VR user 110 (e.g., the reference pin may have been provided by the VR user 110 directly to the transaction processing computer 140 in a previous registration step). This process is described in more detail in FIG. 3. In some embodiments, the position string is encrypted. The encryption key used to encrypt the position string may be determined by the VR device 116 in a number of ways. For example, the VR device 116 may derive the encryption key based on the device ID (associated with the VR device 116), an account identifier for the VR user 110, an account number for the VR user 110, and so forth). The transaction processing computer 140 may be configured to decrypt the position string (e.g., by knowing the encryption key in advance or receiving the key from the VR device 116, such as through a handshake process).

In some embodiments, the seed value sent from the transaction processing computer 140 to the VR device 116 may be encrypted by the transaction processing computer 140. Similarly, this encryption key could be based on a number of factors, including the device ID for the VR device 116, an account identifier for the VR user 110, an account number for the VR user 110, and so forth.

In some embodiments, the VR device 116 may be able to generate the seed value on its own (rather than receive it from the transaction processing computer 140). For example, the VR device 116 may be able to generate the same seed value used by the transaction processing computer 140 based on some information that is commonly known between the two entities. In some instances, the VR device 116 and the transaction processing computer 140 may each keep a running count (e.g., of interactions between the two entities), and the count on each device may be kept in sync and used to generate seed values.

In some embodiments, if the transaction processing computer 140 determines that the PIN number entered by the VR user 110 matches the reference PIN number on file for the VR user 110, the transaction processing computer 140 may continue the transaction authorization process. According to embodiments of the invention, the transaction processing computer 140 may determine, based on the data in the authorization request message, an authorizing entity computer or authorizing computer 150 associated with the VR user 110. For example, transaction processing computer 140 may read the account identifier and may determine that the first six digits of the account identifier comprises an issuer identification number (IIN) specifying an authorizing system associated with VR user 110 or the user's credentials. In one embodiment, authorizing computer 150 may be a computer of an issuing entity that issues credentials to the VR user 110 such as a bank, government agency, security network, etc. Upon determination of the authorizing entity computer, transaction processing computer 140 may determine an address of the authorizing computer 150, so that the authorization request message can be routed to authorizing computer 150 for authorization of the transaction.

Thus, the transaction processing computer 140 may send the authorization request message to authorizing computer 150, and the authorizing computer 150 may receive the authorization request message to determine an authorization result based on the data contained therein. For example, the data may comprise an account identifier or PAN that is associated with an availability of funds or credit that may be compared to a transaction amount. Authorizing computer 150 may evaluate the received data and determine an authorization result of "approve" or "decline." The authorization result may be used to generate an authorization response message that may be sent back to transaction processing computer 140. The transaction processing computer 140 may receive the authorization response message and may send the message to the VR application server 130. This authorization response message may further be forwarded to the VR device 116 and/or computing device 120. The VR application server 130, VR device 116, and/or computing device 120 may use the authorization response message to determine an action based on the authorization result contained therein.

In some embodiments, the transaction processing computer 140 may indicate an additional verification status in the authorization request message prior to sending the message to an authorizing computer 150. For example, the transaction processing computer 140 may modify the authorization request message with the verification status, which may potentially influence the authorization result determined by authorizing computer 150. For example, the transaction processing computer 140 may analyze the transaction data and determine that the user's account is not authorized for virtual transactions. Or, the transaction processing computer 140 may determine that the VR user 110 is seeking to make a transaction associated with the VR software 112—software that has never been used previously by the VR user 110. Thus, the verification status may serve to indicate whether a particular interaction/transaction is less likely to be fraudulent, and thus should be approved by the authorizing computer 150. In another example, the transaction processing computer 140 may analyze the PIN entered by the VR user 110 (e.g., using the process described in FIG. 3) and compare it to the reference PIN on-file for the VR user 110. If there is a match, it is more likely that the VR user 110 is the same user that provided the reference PIN and the transaction is less likely to be fraudulent. The transaction processing computer 140 may then indicate through the verification status that the transaction is less likely to be fraudulent. Thus, the authorizing computer 150 may take into account the verification status in determining an authorization result. Once the authorizing computer 150 determines an authorization result, the authorizing computer 150 may then send the authorization result to the transaction processing computer 150 in an authorization response message. This authorization response message can be forwarded to the VR application server 130, computing device 120, and/or VR device 116 for further action to be taken (e.g., notifying the VR user 110 of the authorization result).

In some embodiments, the VR application server 130, computing device 120, and/or VR device 116 may execute logic based on the contents of the authorization response message. For example, if the authorizing computer 150 determined an authorization result of "approve", that authorization result would be communicated in the authorization response message. Once the VR application server 130 receives that authorization response message and determines the authorization result is "approve", the VR application server 130 may execute logic associated with the transaction being authorized. For example, the VR application server 130 may update its databases or configurations to reflect that the VR user 110 (or the user account associated with the VR user 110) is now in possession of the virtual good or service. Alternatively, if the authorizing computer 150 determined an authorization result of "decline", the VR application server 130 may execute logic based on the transaction being declined (e.g., taking steps to indicate to the VR user 110 that the transaction has been declined). For example, the VR device 116 may generate a notification within the virtual reality environment seen by VR user 110 that indicates the transaction has been declined. In some cases, the VR user 110 may also be informed of the reason why the authorizing computer 150 declined the transaction (e.g., user provided the wrong PIN). This reason may be indicated in the authorization response message. By informing the VR user 110 that the transaction was declined, the VR user 110 may attempt to repeat the transaction again after fixing the issue that was indicated by the authorization response message (e.g., if the transaction was declined because the account for the VR user 110 does not have a certain qualification needed to carry out the transaction, the VR user 110 can attempt the transaction again after the VR user 110 attains that qualification).

At the end of the day or at some other period of time after the entities of the system 100 have responded and taken appropriate action based on the authorization result, a clearing and settlement process can take place and the interaction may be officially recorded. For example, after predetermined logic has been executed by transaction processing computer 140 or by the VR application server 130, an allocation of funds may be facilitated between an issuer of authorizing computer 150, a payment processing network of transaction processing computer 140, and a resource provider (e.g., entity associated with) of the VR application server 130. The allocation of funds may be accounted for by storing data relating to the interaction or transaction in one or more secure databases.

Figure 2:
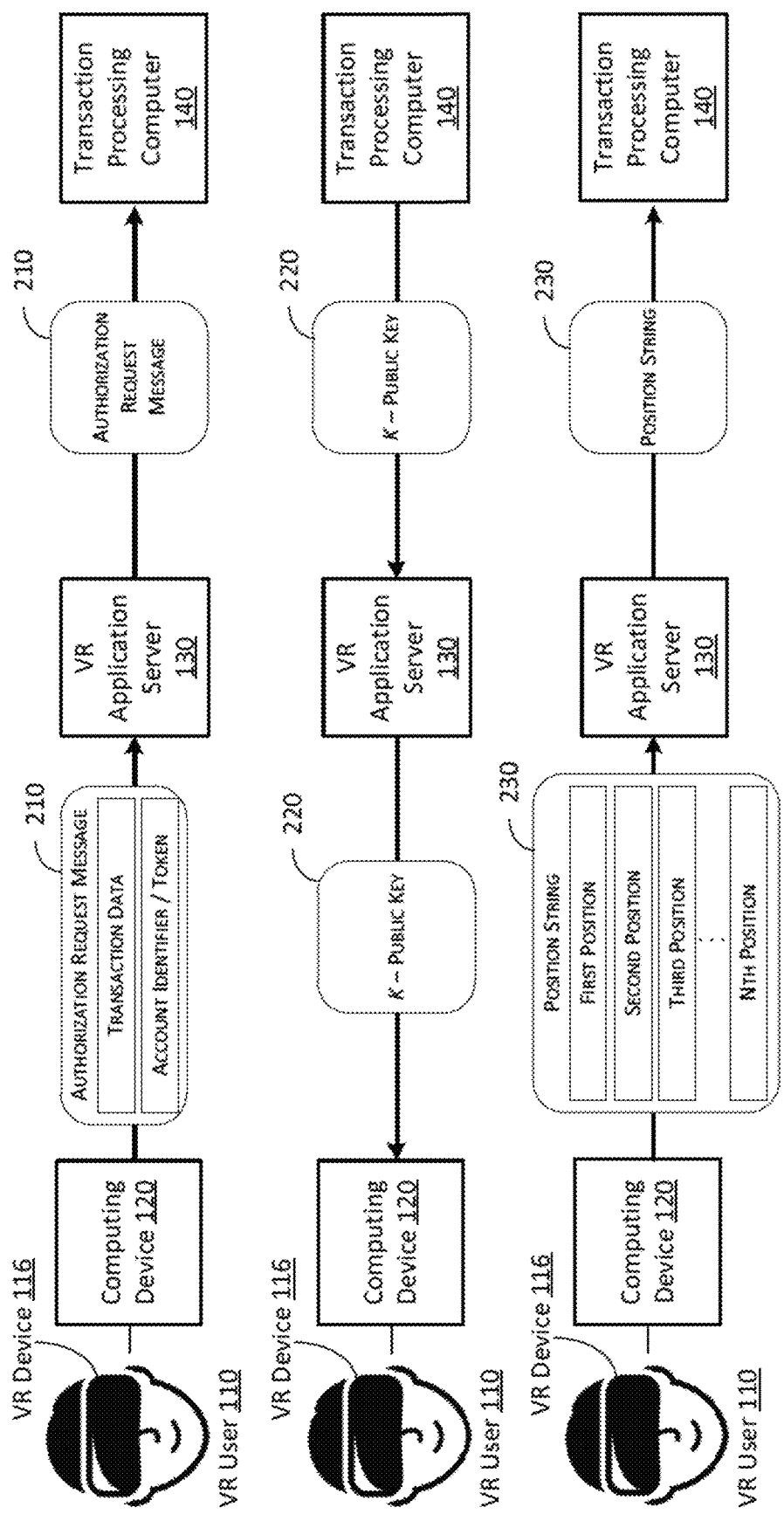
FIG. 2 illustrates the data flow between components of the authorization system according to embodiments of the invention.

FIG. 2 illustrates the data flow between components of the authorization system according to embodiments of the invention.

In should be noted that in this figure, the VR application server 130 is depicted as forwarding various communications and messages (e.g., between the computing device 120 and the transaction processing computer 140). However, in various embodiments, the VR device 116 and/or computing device 120 may send a communication directly to the transaction processing computer 140 at any point in the transaction authorization process—and vice versa. There may be advantages and disadvantages associated with the different implementations. For example, having the VR application server 130 forward communications may increase security at the expense of increased data traffic to and from the VR application server 130.

The VR user 110 of the VR device 116 may seek to initiate an interaction or transaction within a virtual reality environment being rendered by the VR device 116. In some embodiments, the VR device 116 and/or the computing device 120 may send an authorization request message 210 to the VR application server 130. The authorization request message 210 may include relevant transaction data, as well as credentials associated with the VR user 110 (e.g., an account identifier or token). For embodiments in which the VR device 116 and/or the computing device 120 send the authorization request message 210 to the VR application server 130, the VR application server 130 may receive the authorization request message 210 and forward it to a transaction processing computer 140 after checking the transaction for validity.

In some embodiments, the VR application server 130 may perform a check using the contents of the authorization request message 210 in order to determine whether the user's requested interaction is valid. For example, if the user attempted to initiate a transaction within the virtual reality environment of the VR Software (e.g., to purchase an in-game item), the VR application server 130 may perform a check to see if the transaction can be performed to begin with (e.g., that item can be purchased by the user). If for instance, the item is restricted from the user or there is not enough available quantity of the item to satisfy the user's transaction, the VR application server 130 would prohibit the transaction from occurring and not forward the authorization request message 210 to the transaction processing computer 140. To implement this check, the VR application server 130 may analyze the relevant transaction data and credentials for the VR user 110 (e.g., account identifiers, tokens, and so forth) within the authorization request message 210. The transaction data may include any relevant details about the transaction (e.g., the requested item, the user's account, any transaction settings/privileges associated with the user's account, and so forth).

In other embodiments (not shown), the VR device 116 and/or the computing device 120 do not transmit an authorization request message 210. However, in such embodiments, the VR device 116 and/or the computing device 120 may still transmit one or more credentials associated with the user, as well as relevant transaction data, to the VR application server 130. The VR application server 130 may still perform the transaction check detailed above, and if the transaction is permissible, the VR application server 130 may generate the authorization request message 210 to send to the transaction processing computer 140.

Once the transaction processing computer 140 receives the authorization request message 210, the transaction processing computer 140 may decide whether to continue the transaction authorization process. For example, the transaction processing computer 140 may determine the user's account using the account identifier or token and further determine that the user's account does not have enough funds associated with it to carry out a transaction, or that the user's account does not have the appropriate security settings needed to perform the interaction (e.g., to gain access to a restricted area within the virtual environment of the VR software). In such cases, the transaction processing computer 140 may discontinue the transaction authorization process and send a communication (not shown) back to the VR application server 130 indicating that the transaction has been denied.

In some embodiments, the transaction processing computer 140 may determine that, in order to continue the transaction authorization process, additional credentials are needed from the VR user 110. In some of such embodiments, the additional credential may be in the form of a PIN number that is provided by the VR user 110. However, it may be desirable to avoid having the VR user 110 physically enter the PIN number (e.g., by typing it out on the computing device 120). In particular, by having the VR user 110 physically enter the PIN number, the user's PIN number could be exposed to other people, such as people in the same room as the VR user 110 who can observe the PIN number being entered. One alternative is to have the VR user 110 enter the PIN number within the virtual reality environment displayed by the VR device 116. For example, a virtual keypad with a traditional layout (e.g., the 9-digit keypad frequent among ATM machines) can be generated and displayed within the virtual reality environment. The VR user 110 can make selections on that virtual keypad to enter digits of the PIN number. However, this method may have disadvantages as well. In particular, an observer in the same room as the VR user 110 may still be able to observe the VR user 110 make the selections on the virtual keypad. This may be the case if the VR user 110 has to make the selections by moving their head (e.g., the VR device 116 is configured to track the head movements of the user for inputs), since an observer may be able to guess the user's selections on a keypad based on the direction of the user's head movements. This may sometimes still be the case if the VR user 110 has to make selections by moving their eyes (e.g., the VR device 116 is configured to track the eye movements of the user for inputs). For example, if the VR device 116 is transparent and the eyes of VR user 110 are visible (e.g., the VR device 116 is similar to Google Glass), an observer may still be able to guess the user's selections on a keypad based on the direction of the user's eye movements.

An alternative method for allowing the VR user 110 to provide a PIN number without fear of an observer determining the PIN number may involve the generation of virtual keypads with random, or pseudo-random layouts. For example, in some embodiments, a virtual keypad may be generated in the virtual reality environment that has a randomized layout different from the traditional layout (e.g., the numbers 1 through 9 are not presented in numerical order). If this keypad is visible only to the VR user 110, then an observer in the same room as the VR user 110 would not be able to reliably determine the user's PIN number from eye movements or head movements.

To take this a step further, in some embodiments, a virtual keypad with a different, randomized layout could be generated for each digit of the PIN number that the VR user 110 has to enter. An observer in the same room as the VR user 110 would be unable to determine the PIN number from eye movements or head movements since the direction of those movements becomes meaningless as the numbers corresponding to those directions change with each selection.

Furthermore, for increased security, the VR device 116 and/or computing device 120 also do not have to send (e.g., to the transaction processing computer 140) the actual digits of the user's PIN number that was entered. This would be an added safeguard against man-in-the-middle attacks or if that PIN number transmission was intercepted by a third party. Instead of the actual digits, the positions within the keypad layouts that correspond to the user's selections can be sent.

For example, if the user selected the number "3" located in the upper-left corner of a keypad, rather than sending "3" as the digit for the PIN, the position of that selection can be sent instead (e.g., Position "1" if that position corresponds to the upper-left key in the keypad). There only needs to be a common convention for the numbering of keypad positions that is known in advance by the VR software, VR device 116, and/or computing device 120, as well as by the transaction processing computer 140. The transaction processing computer 140 may be able to take these various positions associated with the user's sections and reverse-engineer the actual digits of the PIN number from them. To do so, the transaction processing computer 140 may need to know how the layouts were generated for the keypads displayed to the VR user 110. In some cases, the transaction processing computer 140 may have access to the same layout-generation algorithm used to generate the layouts of the keypads displayed to the VR user 110, which would allow the transaction processing computer to reverse engineer the actual digits from the positions of the user's key selections for those keypads. This process is described more in FIG. 3.

In some embodiments, the mathematical algorithm used to generate the layout of a keypad may depend on an initial seed value. If the transaction processing computer 140 knows the seed value used by the VR device 116 to generate the layout of the initial keypad, then the transaction processing computer 140 may be able to use that seed value along with the mathematical algorithm in order to generate the same keypad layout generated by the VR device 116. In some embodiments, this initial seed value may be a public encryption key 220 associated with the transaction processing computer 140.

In some embodiments, the transaction processing computer 140 may send the public key 220 either to the VR application server 130, or directly to the VR device 116 and/or computing device 120. If the public key 220 is sent to the VR application server 130, the VR application server 130 can forward the public key 220 to the computing device 120. As described in FIG. 3, the public key 220 may be used by the VR software or VR device 116 to generate a layout for a keypad that is rendered and displayed to the VR user 110 through the VR device 116. In some embodiments, the user's selection within this keypad may be used as a seed value in a mathematical algorithm for generating the layout for another keypad. Thus, in some embodiments the user may provide multiple selections with each selection taking place on a different keypad with a different layout. Thus, the layouts of each successive keypad may be iteratively dependent on the user's selections in previous keypads and the initial seed value used to generate the first keypad.

After the user provides the PIN number by selecting various key positions in the keypads that were generated, the VR device 116 and/or the computing device 120 may send a position string 230 to the VR application server 130 or directly to the transaction processing computer 140. If the position string 230 is sent to the VR application server 130, the VR application server 130 can forward the position string 230 to the transaction processing computer. The position string 230 may contain the positions within the generated keypads that correspond to the user's selections. For example, the position string 230 may include a first position that indicates the user's selection for the first keypad, a second position that indicates the user's selection for the second keypad, a third position that indicates the user's selection for the third keypad, and so forth (e.g., up to the Nth position corresponding to the user's selection for the Nth keypad).

Once the transaction processing computer 140 receives the position string 230, the transaction processing computer 140 may be configured to determine PIN number entered by the user using the positions indicated in the position string 230. This process is described in FIG. 3. The entered PIN number may be compared against a reference PIN number that is on-file for the user (e.g., that was associated with the user's account during a previous registration process). In some embodiments, the positions may be compared directly rather comparing than the underlying digits for the PIN number. For example, the positions within the position string 230 may be compared against the positions that would correspond to the reference PIN number on-file for the user.

If there is a match (e.g., the user entered PIN matches the reference PIN, or the positions of the position string 230 and their orders perfectly match the positions associated with the reference PIN), this may indicate to the transaction processing computer 140 that the transaction is not likely to be fraudulent since the VR user 110 provided the correct PIN number. The transaction processing computer 140 may continue the transaction authorization process, which in some cases may involve the transaction processing computer 140 first determining a verification status before forwarding the authorization request message 210 to an authorizing computer. For example, the transaction processing computer 140 may make additional determinations on whether the transaction is likely to be fraudulent, such as by reviewing the details of the transaction from the transaction data. As non-limiting examples, a transaction for a large amount may be more likely to be fraudulent, as well as a transaction that is part of multiple transactions repeated in a short period of time when that particular user had no history of making such transactions. Once the transaction processing computer 140 makes this determination, the transaction processing computer 140 may then indicate through the verification status that the transaction is less likely to be fraudulent. This verification status may be added to the authorization request message prior to sending the authorization message to the authorizing computer, which will determine whether to authorize the interaction/transaction and send an authorization response message (not shown) that will ultimately make its way back to the VR application server 130 or the computing device 120.

In some embodiments, the system may have an added feature for mitigating man-in-the-middle attacks by ensuring the position string sent from the VR device to the transaction processing computer changes each time despite the user entering the same PIN number every time. For example, the seed value can be changed for each authorization process. Since the seed value keeps changing and is different for each transaction, the initial layout of the first keypad will be different in each transaction. This means all the subsequent keypad layouts will be different, even if the user is entering the same PIN number each time. This leads to a different position string being sent each time, such that a third party which intercepts the position string transmission will not be able to use that position string again (e.g., the third party would not be able to pass that position string to the server in another transaction). In some embodiments, the algorithm for generating the layout of subsequent keypads may change across transactions. The transaction processing computer may inform the VR device which algorithm to use (e.g., through an algorithm identifier), which will lead to different layouts being generated even if the same seed value as a previous transaction of the user is used. Accordingly, by varying the seed value and/or the layout generation algorithm for each transaction, a different "correct" position string can be generated even if the user is entering the same PIN number for each transaction. From the user's perspective, the layouts of the keypads will just be different for each transaction.

Figure 3:
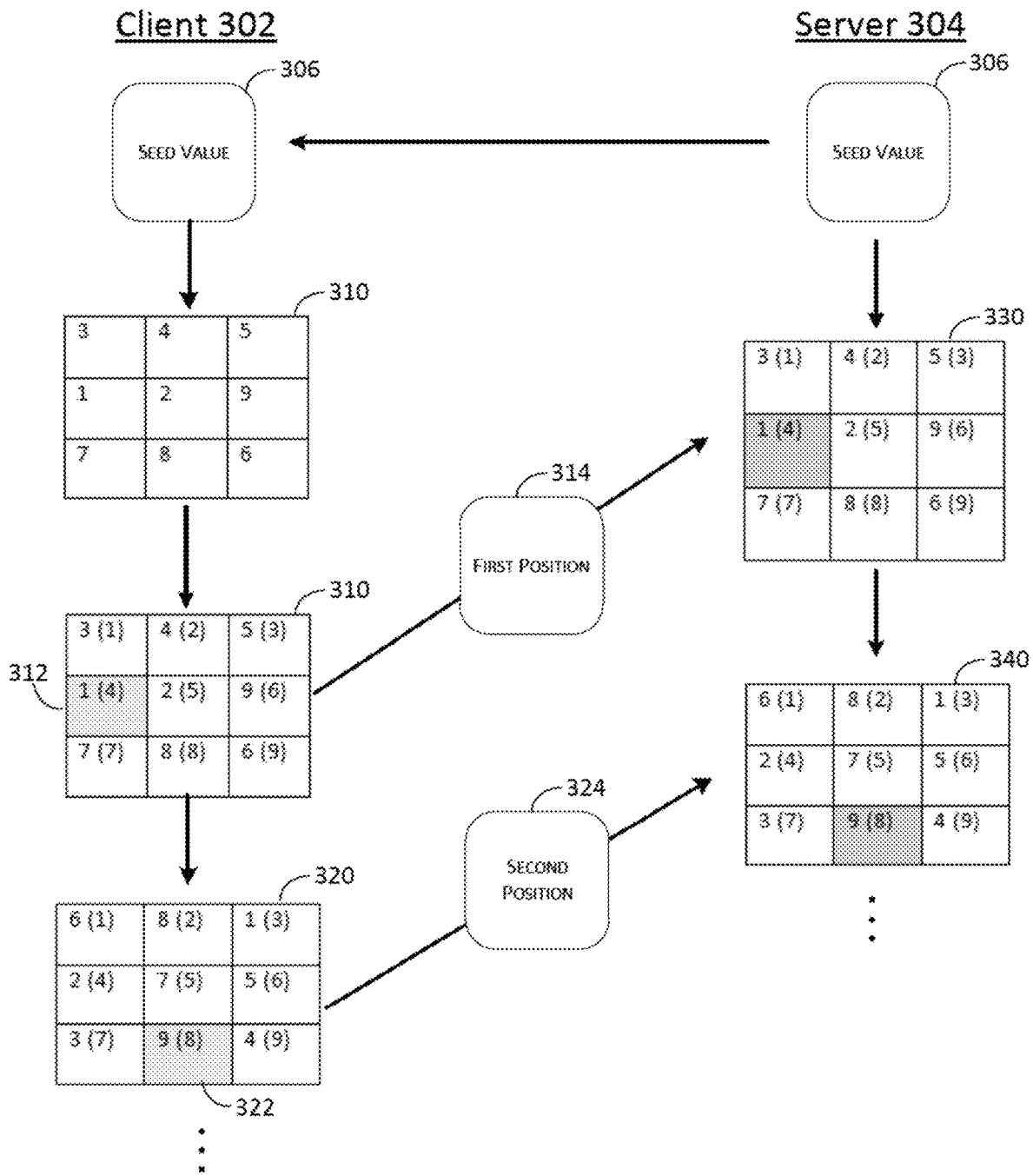
FIG. 3 illustrates how a seed value for generating keypad layouts may be used by the authorization system according to embodiments of the invention.

FIG. 3 illustrates how a seed value for generating keypad layouts may be used by the authorization system according to embodiments of the invention.

The figure illustrates a seed value 306, which originates from the server 304 and may be sent to the client 302. In some embodiments, the seed value 306 may be the public key 220 shown in FIG. 2. In some embodiments, the server 304 may be the transaction processing computer 140. In some embodiments, the client 302 may be the VR device 116 and/or the computing Device 120. In some of such embodiments, the client 302 may be the VR device 116 worn by the VR user 110 and may also include the accompanying VR software 112 being run on the VR device 116.

In some embodiments, the seed value 306 may be a public key that is shared between the client 302 and the server 304, such as the public key used in a public-private key encryption algorithm like RSA. The seed value 306 may be used by the client 302 to seed the generation of the layout of a first keypad 310 that is displayed to the user (e.g., through a display of the VR device 116). More specifically, the seed value 306 may be the initial input value used in the mathematical procedure to generate the first keypad 310.

For example, the first keypad 310 is shown as having the numbers 1 through 9 arranged in a 3×3 grid. However, the exact order and arrangement of those numbers can be pseudo-randomly determined (e.g., a result that appears to be random but is not—rather, it is generated in a deterministic process involving a definite mathematical procedure). In other words, the order of those numbers in the keypad may depend on the repeatable mathematical procedure used to generate the order and an input value used for that mathematical procedure. Thus, a particular input value will result in a specific order that will be seemingly random but can be repeatedly reproduced based on that input value.

In some embodiments, the mathematical algorithm used can be a trapdoor function, which is a function that is easy to compute in one direction (e.g., determining a keypad layout from an input value) but difficult to compute in the opposite direction (e.g., using a keypad layout in order to determine the input value used to generate that layout). In some embodiments, the mathematical algorithm may produce a pseudo-random output based on an input. For example, if the public key is referred to as "K", then the layout of the first keypad can be generated using the function: Rand(K). In some embodiments, the mathematical algorithm used to generate the layout for the initial, first keypad may be the same algorithm as the mathematical algorithm used to generate the layout for subsequent keypads. In some embodiments, the mathematical algorithm used to generate the layout for the initial, first keypad may be a different algorithm from the mathematical algorithm used to generate the layout for subsequent keypads.

The user may then make a selection within the first keypad 310 based on the user's PIN number (e.g., to provide the first digit of the PIN number), and the position within the keypad corresponding to the user's selection may be used as an input value for the mathematical procedure to generate the next keypad. For example, the first keypad 310 has a 3×3 grid layout and the first row of keys in the keypad can be thought of as corresponding to positions 1 through 3. The second row of keys in the keypad can correspond to positions 4 through 6, and the third row of keys in the keypad can correspond to positions 7 through 9. However, in other embodiments, the positions of the keypad may be arranged differently. In the specific arrangement of the figure, the first keypad 310 displays a key with the number 1 in the 4th position. If the user makes a selection 312 of this key, the 4th position of that key is noted and can be used as an input value for the next keypad rather than the number displayed for that key. The position in the keypad corresponding to the user's selection 312 can be sent as the first position 314 to the server 304 to be used in the validation process. In some embodiments, this position may be immediately sent to the server 304, while in other embodiments, all of the positions corresponding to the user's selections may be sent at once (e.g., in the form of a position string).

Accordingly, in this specific example, the 4th position is used as an input value in generating the order of keys in the second keypad 320. In other words, the generation of the layout in subsequent keypads may be based on the position of the selected number in the layout of the preceding keypad. In some embodiments, the mathematical algorithm used to generate the layout of keypads (other than the layout of the initial keypad) may be: Rand(K+(P(i)), where K is the public key or initial seed value, and P(i) represents the position of the number selected in the keypad during the ith iteration. For example, in this case the 4th position corresponds to the first selection 312 of the first keypad 310, so the function used can be Rand(K+4). The output of that function can be used in ordering the layout of keys in the second keypad 320.

This second keypad 320 is then displayed to the user (e.g., through a display of the VR device 116), and in some cases the second keypad 320 may replace the first keypad 310 being displayed to the user. In some embodiments, from the user's perspective only the order of the keys in the keypad seen by the user changes. The user may then make another selection within the second keypad 320 based on the user's PIN number (e.g., to provide the second digit of the PIN number). For instance, the user could make the selection 322 of the number 9 displayed on the key in the 8th position. This position in the keypad corresponding to the user's selection 322 can be sent as the second position 324 to the server 304 to be used in the validation process.

This position can also be used to generate a third keypad (not shown), which can be used to capture a third digit of the PIN number. Thus, for embodiments in which the mathematical function used to generate the layout is Rand(K+P(i)), the layout of the keys in third keypad would be generated using the function Rand(K+8) with the 8 corresponding to the position of the selection 322 in the second keypad 320. The third keypad would then be displayed to user to provide a selection. This process can be repeated a number of times depending on the total number of digits in the user's PIN number.

In some embodiments, the positions of the various selections made by the user (including first position 314 and second position 324) may be sent to the server 304 in a position string. An example of a position string may be "04080103". This position string can be parsed into the individual positions—for instance: 04, 08, 01, 03. Those numbers may be for the four positions corresponding to selections made in four keypads (e.g., 4th position in a first keypad, 8th position in a second keypad, 1st position in a third keypad, and 3rd position in a fourth keypad). This method ensures that the actual PIN number is not sent from the client 302 to the server 304, and that only the relative positions for the keypads are sent.

Once the server 304 receives the various positions corresponding the user's selections, the server may be able to devise the actual PIN number using the mathematical algorithm since the layout of the initial keypad is known. More specifically, the server 304 can generate the layout of the initial keypad using the initial input value used by the client 302 (e.g., seed value 306). Thus, in some embodiments, the initial input value used may be the seed value 306 (or any other suitable value that is also used by the client 302 in generating a layout of the initial keypad). If the initial input value and mathematical algorithm used to generate the first keypad 310 is used, then the server 304 should arrive at a layout for keypad that has the same ordering of keys as the first keypad 310.

For example, the first keypad 330 may be generated if the server 304 uses the seed value 306 to generate the layout of a keypad. Since the same seed value 306 was used as the initial input, the layout of the first keypad 330 is identical to the first keypad 310 generated by the client 302.

The server 304 may perform a validation of user's PIN number based on the positions that it receives. For example, as the server 304 receives the first position 314, the server 304 may determine that the key in the first keypad 330 corresponding to the first position 314 (e.g., the fourth position) is the 4th key that displays the number 1. Thus, the first digit of the user's PIN number is the number 1. The server 304 then uses the position of that key (e.g., four) as an input value to generate the layout of the next keypad, the second keypad 340.

Since the same input value was used by the server 304 to generate the second keypad 340 as the client 302 used to generate the second keypad 320, the layout of the second keypad 340 is identical to the layout of the second keypad 320. As the server 304 receives the second position 324, the server 304 may determine that the key in the second keypad 340 corresponding to the second position 324 (e.g., the eighth position) is the 8th key that displays the number 9. Thus, the second digit of the user's PIN number may be the number 9. The server 304 can then use the position of that key as an input value to generate the layout of the next keypad (not shown) until the values for each digit of the PIN number entered by the user are determined.

Afterwards, the server 304 may compare the user's provided PIN number against a reference PIN number that is on-file and associated with the user's account. If there is a match (e.g., the user provided the correct PIN number), the server 304 may proceed in the authorization process, which could entail authorizing the interaction or transaction, sending a communication to another entity that will authorize the interaction or transaction, or performing additional verification checks on the transaction, and so forth. In some cases, the server 304 may send an authorization message to a different entity for authorizing the transaction, but the server 304 may first add a verification status to the message that reflects that the transaction is verified (e.g., not likely to be fraudulent). If there is no match, then the server 304 may send a communication back to the client 302 indicating the interaction is denied due to the wrong PIN number.

Figure 4:
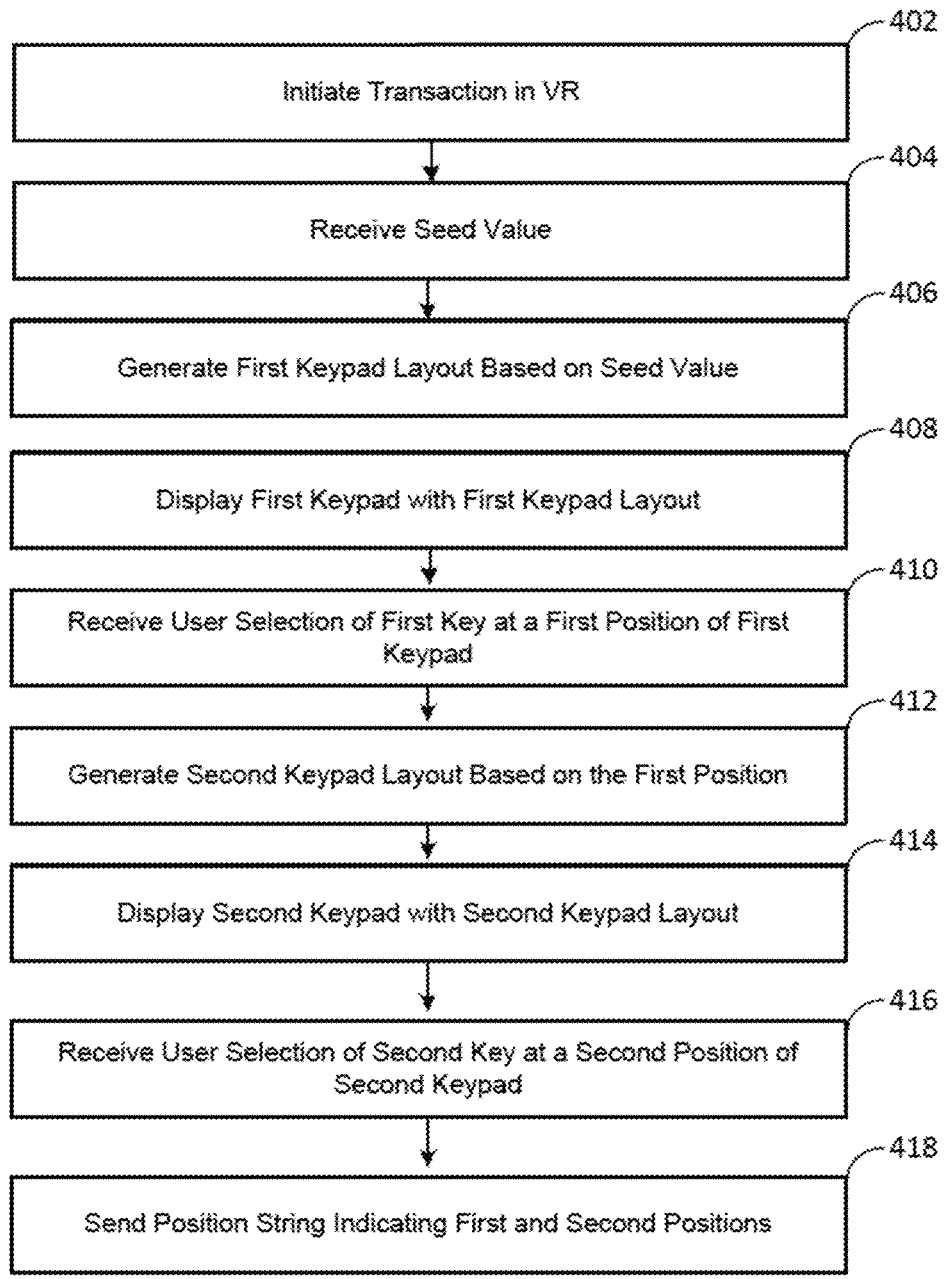
FIG. 4 is a flowchart depicting a keypad generation process used by the authorization system according to embodiments of the invention.

FIG. 4 is a flowchart depicting a keypad generation process used by the authorization system according to embodiments of the invention.

In the figure, a keypad generation process is shown that involves two keypads, which would correspond to two user selections. This implies that the user's PIN number being entered has two digits. However, in other embodiments, the user's PIN number may have any number of digits. Thus, there may be any number of keypads being generated. In some embodiments, the number of keypads generated may correspond to the user's selections of each digit of their PIN number.

At Block 402, a user of a VR device may initiate a transaction in a virtual reality environment (e.g., that is being displayed to the user through the VR device). For example, the user may walk up to a virtual merchant in the virtual reality environment and seek to purchase a virtual item from the merchant. In some embodiments, to initiate the transaction the VR device may send out a communication with relevant transaction details and one or more credentials associated with the user, so that a computer configured to process transactions can determine if the transaction can take place. In some embodiments, this communication may be an authorization request message. However, in some cases, the user may need to furnish additional credentials (such as a PIN number) in order for the transaction to be authorized, and the user may have to provide this PIN number by making selections in keypads that are rendered in the virtual reality environment.

At Block 404, the VR device may receive a seed value to be used in generating the layout of the first keypad displayed to the user. In some embodiments, this seed value may be received from the transaction processing server. In some embodiments, this seed value may be a public encryption key associated with the transaction processing server.

At Block 406, the VR device may generate a first keypad layout using the received seed value by using the seed value as an initial input in a mathematical procedure or algorithm for generating the layout of the keypad. The algorithm used may generate the keypad layout on a pseudo-random basis.

At Block 408, the VR device may display a first keypad with the first keypad layout to the user (e.g., by rendering the first keypad in the virtual reality environment so that the user can see it in the display of the VR device).

At Block 410, the VR device may receive a user selection of a first key at a first position of the first keypad. In some embodiments, this can be done by monitoring the user's eye movements or the user's head movements. For instance, the VR device may have components for tracking eye movements and the user could select a key in a certain position by looking directly at the key.

At Block 412, the VR device may generate a second keypad layout based on the first position (e.g., the position in the keypad of the first key selected by the user).

At Block 414, the VR device may display a second keypad with the second keypad layout to the user. In some embodiments, the second keypad may replace the first keypad. For example, the second keypad can be rendered to replace the first keypad being displayed in the virtual reality environment.

At Block 416, the VR device may receive a user selection of a second key at a second position of the second keypad.

At Block 418, the VR device may transmit a position string indicating the first and second positions that correspond to the user's selections. The position string may be transmitted to a processing computer (e.g., for processing the transaction), which can verify the user using the position string (e.g., as described in FIG. 3).

Figure 5:
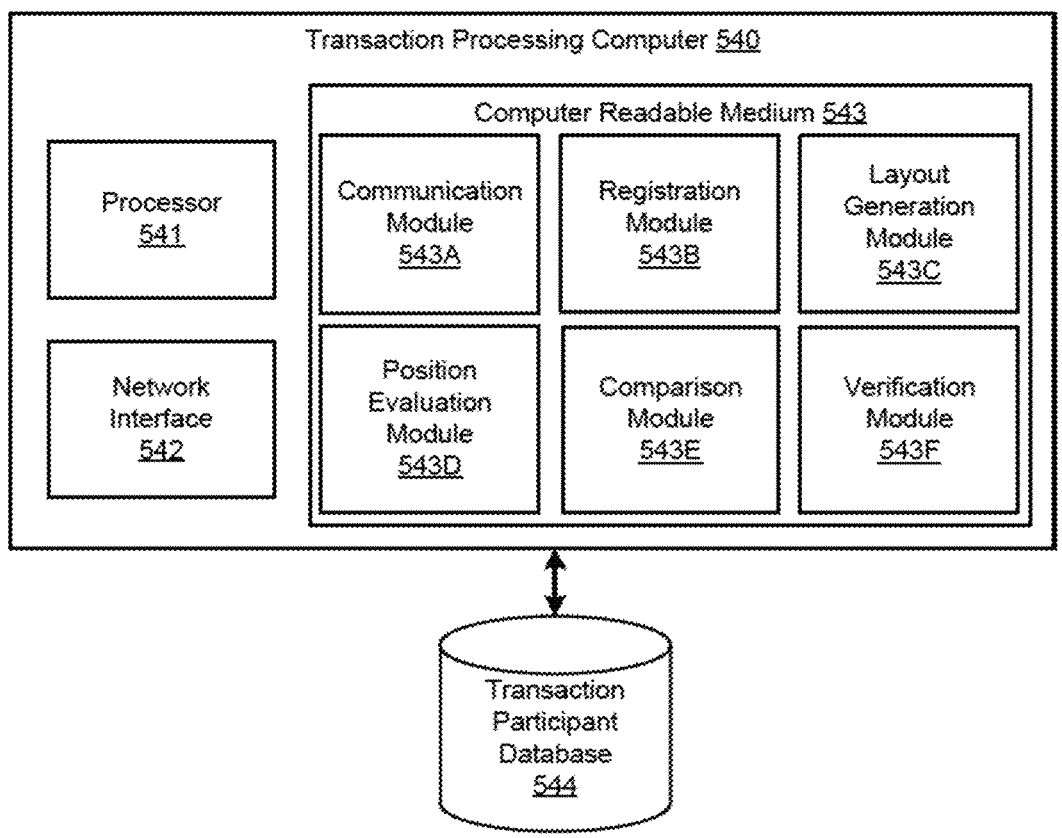
FIG. 5 is a component diagram of a transaction processing computer in the authorization system according to embodiments of the invention.

FIG. 5 is a component diagram of a transaction processing computer in the authorization system according to embodiments of the invention.

The transaction processing computer 540 may be any computer, device, or server computer configured to process interactions and/or transactions between a user of a VR device and a resource provider, which may be affiliated with a VR application server such as the VR application server 130 of FIG. 1. In some embodiments, the transaction processing computer 540 may comprise a processor 541 for executing instructions or logic, a network interface 542 for sending and receiving messages over a network, and computer readable medium 543 for storing instructions or modules that may be executed by processor 541 to perform tasks and methods according to embodiments of the invention. The instructions or modules may be in the form of code stored in an application or of an application programming interface (API).

Regarding the network interface 542, the transaction processing computer 540 may use any suitable contact or contactless modes of operation to send or receive data from, or associated with, the VR device 116, computing device 120, and/or the VR application server 130. For example, the transaction processing computer 540 may be configured to communicate with the VR device 116 and/or the computing device 120 using near-field communications, Bluetooth, local area network, internet protocol, etc. The transaction processing computer 540 may also be configured to communicate with the VR application server 130, such as through near-field communication, Bluetooth, local area network, internet protocol, etc. Accordingly, the network interface 542 may include a chip or components configured to send and receive communications using such methods. In some embodiments, the VR device 116 and/or the Computing Device 120 may be able to transmit to the transaction processing computer 540 an authorization request message containing data to be used in the authorization process. For example, the VR device 116 and/or the computing device 120 may provide relevant transaction data and one or more credentials associated with a user's account. The transaction processing computer 540 can then check if the transaction is valid and whether to proceed with the authorization process.

In some embodiments, the computer readable medium 543 may comprise communication module 543A for instructing processor 541 to receive, format, and transmit data and/or messages according to embodiments of the invention. For example, communication module 543A may comprise code instructing transaction processing computer 540 to receive and reformat authorization messages that are communicatively exchanged through network interface 542. In some embodiments, the communication module 543A may further comprise code for identifying an authorizing computer based on at least a portion of an authorization request message (e.g., at least a portion of an account identifier). For example, an account identifier may be a 16-digit primary account number (PAN) and the transaction processing computer 540 may determine that the first 6 digits identifies a specific issuer or authorizing entity such as '469216-JP Morgan Chase.' Thus, the communication module 543A may dictate which authorizing computer the transaction processing computer 540 will route the authorization request message to, should the transaction processing computer 540 decide to continue the transaction authorization process. In some embodiments, the communication module 543A may comprise code instructing the transaction processing computer 540 to receive, parse, and/or identify (from the authorization request message), the transaction data, user credentials, and/or account identifier for the user. In some embodiments, the communication module 543A may also be responsible for the generation and transmission of communications that are sent to a VR device in order to request for additional credentials from the user of the VR device. This communication may involve sending a seed value (e.g., public key) usable as an initial input in generating the layout of a virtual keypad. The communication module 543A may also be responsible for receiving position strings or communications that indicate the relative positions of the user's selections, and then the position string into the individual positions to be used by the position evaluation module 543D.

In some embodiments, the computer readable medium 543 may comprise registration module 543B for instructing processor 541 to perform registration for a user. This registration process may involve receiving a user's PIN for the first time to serve as a reference PIN in verifying future transactions. A user's reference PIN may be stored (e.g., in a transaction participant database 544) and may be linked to a user's account or the account identifier for that account. Thus, when the transaction processing computer 540 receives an account identifier for a user, the transaction processing computer 540 can look up the reference PIN that is associated with that account identifier in order to use it for verification purposes.

In some embodiments, the computer readable medium 543 may comprise a layout generation module 543C for instructing processor 541 to generate keypad layouts to be used in the manner described for server 304 in FIG. 3. For example, the layout generation module 543C may feed one or more inputs into a mathematical algorithm in order to determine a pseudo-random layout for a keypad. This keypad can be used by a position evaluation module 543D with a position value received from a VR device in order to determine the number corresponding to a certain position of the keypad.

In some embodiments, the computer readable medium 543 may comprise a position evaluation module 543D for instructing processor 541 to evaluate the relative positions corresponding to user selections of a keypad in the manner described for server 304 in FIG. 3. For example, the layout generation module 543C may feed one or more inputs (e.g., a position value of a preceding keypad) into a mathematical algorithm in order to determine a pseudo-random layout for a subsequent keypad. The next position value can be used with this subsequent keypad in order to determine the key at the position of that keypad corresponding to the position value, and the number for that key may be evaluated as a digit for the user's PIN number. Thus, the position evaluation module 543D and the layout generation module 543C may work in unison to evaluate the value of each digit of the user's PIN number that the user entered through their VR device.

In some embodiments, computer readable medium 543 may comprise comparison module 543E for instructing processor 541 to compare the user's PIN number that they entered for the transaction (e.g., the PIN number evaluated by the position evaluation module 543D and/or layout generation module 543C) and the reference PIN number that is on file for the user. For instance, the comparison module 543E may comprise code that instructs the transaction processing computer 540 to each individual digit of the user's PIN number to each individual digit of the reference PIN number in order to check if there is an absolute match.

In some embodiments, the computer readable medium 643 may comprise verification module 543F for instructing processor 541 to perform additional verification checks for the transaction and/or determine a verification status that can be communicated to the authorizing computer. For example, if the comparison between the user supplied PIN and the reference PIN is an absolute match, that may support a determination of a verification status of "verified" since the transaction is less likely to be fraudulent. In some embodiments, the verification module 543F may determine a verification status of either "verified" or "unverified" in order to indicate whether the transaction is likely or not likely to be fraudulent, and in some of such embodiments, the authorization request message can be modified with the verification status (e.g., by the communication module 543A) before it is sent off to the authorizing computer. In some embodiments, the verification module 543F may be responsible for generating a risk score that may be sent in addition to, or in lieu of, the verification status to the authorizing computer. For example, a risk score can be generated ranging from '0' to '100' by evaluating such factors as transaction amount, associated riskiness of resource provider identifier, associated riskiness of account identifier, time of day that transaction occurs, how frequently the user has made related virtual interactions/transactions, and so forth. The risk score may be added to the authorization request message in order to affect an authorization result determined by an authorizing computer or entity, or may be used to reject or authorize a transaction depending on predetermined preferences of the authorizing entity. In some embodiments, the risk score may serve as a metric to convey to the authorizing computer how likely it is the transaction is fraudulent.

In some embodiments, transaction processing computer 540 may be coupled to transaction participant database 544 for storing and linking data relating to users, such as the account identifiers and/or reference PIN numbers associated with a user account. In some embodiments, the transaction participant database 544 may also include resource provider identifiers of various resource providers.

Figure 6:
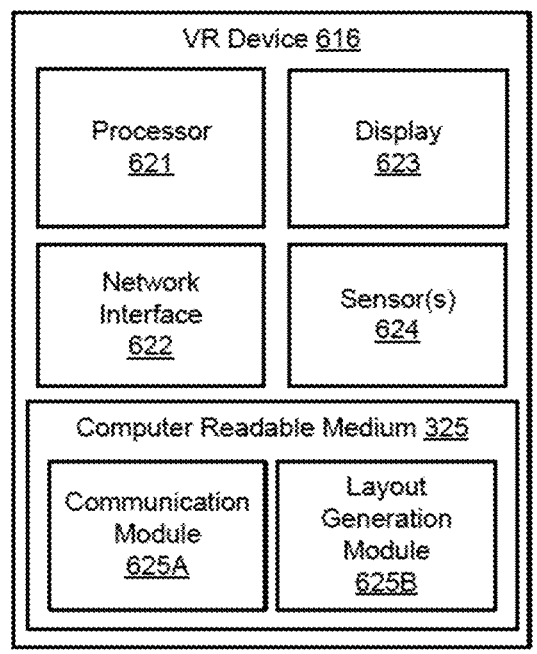
FIG. 6 is a component diagram of a virtual reality device in the authorization system according to embodiments of the invention.

FIG. 6 is a component diagram of a virtual reality device in the authorization system according to embodiments of the invention.

The VR device 616 may be any device that can be used by a user to view and access a virtual reality environment. Some examples of VR devices include the Oculus Rift headset, the Vive headset, the PlayStation VR headset, the Gear VR headset, and so forth.

In some embodiments, the VR device 616 may comprise a processor 621 for executing instructions or logic, a network interface 622 for sending and receiving data and messages over electronic communications channel (e.g., a physical cable or a network), a display 623 for displaying a virtual reality environment to a user, and one or more sensors 624 which may be configured to monitor and receive inputs from the user. The display 623 may be any suitable component capable of displaying graphics associated with the virtual reality environment. For example, the display 623 could be a screen, a lens, a projector (e.g., for projecting images onto a surface), and so forth. The sensors 624 may include one or more sensors used to capture inputs or user selections. Some examples of such sensors may include gyroscopes (e.g., for capturing head movements), cameras (e.g., for capturing eye movements), motion detectors, wands, buttons, keys, and other suitable input devices.

Regarding the network interface 622, the VR device 616 may use any suitable contact or contactless modes of operation to send or receive data from, or associated with, a computing device (e.g., computing device 120), VR application server (e.g., VR application server 130), or a transaction processing computer (e.g., transaction processing computer 140). For example, the VR device 616 may be configured to communicate with the computing device 120 using a USB cable, near-field communications, Bluetooth, local area network, internet protocol, etc. Accordingly, the network interface 622 may include a chip or components configured to send and receive communications using such methods. In some embodiments, the VR device 616 may be able to communicate with the computing device 120 in order to facilitate a transmission of a form of a user credential to a transaction processing computer 140 to be used in the transaction authorization process.

In some embodiments, the VR device 616 may comprise computer readable medium 625 for storing instructions or modules that may be executed by processor 621 to perform tasks and methods according to embodiments of the invention. The instructions or modules may be in the form of code stored in an application or of an application programming interface (API).

In some embodiments, the computer readable medium 625 may comprise communication module 625A for instructing processor 621 to receive, format, and transmit data and/or messages according to embodiments of the invention. For example, communication module 625A may comprise code instructing the VR device 616 to receive a seed value from the transaction processing computer through the network interface 622. The communication module 625A may also be responsible for sending position strings or communications that indicate the relative positions of the user's selections, which can be used by the transaction processing computer to verify the user.

In some embodiments, the computer readable medium 625 may comprise layout generation module 625B for instructing processor 621 to generate keypad layouts to be used in the manner described for client 302 in FIG. 3. For example, the layout generation module 625B may feed one or more inputs into a mathematical algorithm in order to determine a pseudo-random layout for a keypad. This keypad can be displayed to the user via the display 623 in order to receive a user selection from the sensors 624.

Additional Implementation Details

Specific details regarding some of the above-described aspects are provided above. The specific details of the specific aspects may be combined in any suitable manner without departing from the spirit and scope of embodiments of the invention.

It should be understood that the present invention as described above can be implemented in the form of control logic using computer software (stored in a tangible physical medium) in a modular or integrated manner. Based on the disclosure and teachings provided herein, a person of ordinary skill in the art will know and appreciate other ways and/or methods to implement the present invention using hardware and a combination of hardware and software.

Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention.

A recitation of "a", "an" or "the" is intended to mean "one or more" unless specifically indicated to the contrary.

All patents, patent applications, publications, and descriptions mentioned above are herein incorporated by reference in their entirety for all purposes. None is admitted to be prior art.

What is claimed is:

1. A computer-implemented method, comprising:
obtaining, by a virtual reality device, a first seed value;
generating, by the virtual reality device, a first keypad layout based on the first seed value, the first seed value used as an initial input for a first algorithm to generate the first keypad layout;
displaying, by the virtual reality device, a first keypad in a display of the virtual reality device, wherein the first keypad has the first keypad layout;
receiving, by the virtual reality device, a user selection from a user of a first key at a first position of the first keypad;
receiving, by the virtual reality device and from a processing computer, an algorithm identifier;
determining, by the virtual reality device, a particular layout generation algorithm from one or more layout generation algorithms based at least in part on the algorithm identifier, the particular layout generation algorithm different from the first algorithm;
generating, by the virtual reality device, a second keypad layout based on using the first position to determine a second seed value that is provided as input to the particular layout generation algorithm executed at the virtual reality device, wherein the second keypad layout has keys in positions that are different than the keys in the first keypad layout;
displaying, by the virtual reality device, a second keypad in place of the first keypad in the display of the virtual reality device, wherein the second keypad has the second keypad layout;
receiving, by the virtual reality device, the user selection of a second key at a second position of the second keypad; and
transmitting, by the virtual reality device, a position string to the processing computer, wherein the position string indicates at least the first position and the second position,
wherein the processing computer validates the user using the position string.

2. The method of claim 1, wherein the first seed value is received from the processing computer.

3. The method of claim 1, wherein the virtual reality device and the processing computer each comprise a data processor, and a computer readable medium comprising a keypad layout generation module.

4. The method of claim 1, wherein the first seed value is a public encryption key associated with the processing computer.

5. The method of claim 1, wherein generating the first keypad layout based on the first seed value involves using the first seed value as the initial input for a function to produce a pseudo-random result.

6. The method of claim 1, wherein the first keypad comprises a first set of keys, and wherein the first set of keys has nine keys.

7. The method of claim 1, wherein obtaining the first seed value includes receiving or generating the first seed value.

8. A virtual reality device, comprising:
one or more processors;
a display; and
a non-transitory computer readable medium storing one or more program instructions executable on the one or more processors to cause the one or more processors to:
obtain a first seed value;
generate a first keypad layout based on the first seed value, the first seed value used as an initial input for a first algorithm to generate the first keypad layout;
display a first keypad in the display, wherein the first keypad has the first keypad layout;
receive a user selection from a user of a first key at a first position of the first keypad;
receive, from a processing computer, an algorithm identifier;
determine a particular layout generation algorithm from one or more layout generation algorithms based at least in part on the algorithm identifier, the particular layout generation algorithm different from the first algorithm;
generate a second keypad layout based on using the first position to determine a second seed value that is provided as input to the particular layout generation algorithm executed at the virtual reality device, wherein the second keypad layout has keys in positions that are different than the keys in the first keypad layout;
display a second keypad in place of the first keypad in the display, wherein the second keypad has the second keypad layout;
receive a user selection of a second key at a second position of the second keypad; and
transmit a position string to the processing computer, wherein the position string indicates at least the first position and the second position, and
wherein the processing computer validates the user using the position string.

9. The virtual reality device of claim 8, wherein the first seed value is received from the processing computer.

10. The virtual reality device of claim 8, wherein the processing computer comprises a data processor, and a computer readable medium comprising a keypad layout generation module.

11. The virtual reality device of claim 8, wherein the first seed value is a public encryption key associated with the processing computer.

12. The virtual reality device of claim 8, wherein generating the first keypad layout based on the first seed value involves using the first seed value as the initial input for a function to produce a pseudo-random result.

13. The virtual reality device of claim 8, wherein the first keypad comprises a first set of keys, wherein the second keypad comprises a second set of keys, and wherein the first set of keys and the second set of keys both have nine keys.

14. A computer-implemented method, comprising:
obtain, by a processing computer, a first seed value;
receiving, by the processing computer, a position string indicating at least a first position and a second position, wherein the first position corresponds to a user selection of a first key of a first keypad having a first keypad layout based on the first seed value, and wherein the second position corresponds to a user selection of a second key of a second keypad having a second keypad layout based on the first position;
generating, by the processing computer, a first server keypad layout based on the first seed value, the first seed value used as an initial input for a first algorithm to generate the first keypad layout;

evaluating, by the processing computer, a first digit of a Personal Identification Number (PIN) based on the first position and the first server keypad layout;

generating, by the processing computer, a second server keypad layout based on using the first position to determine a second seed value that is provided as input to a particular layout generation algorithm executed at the processing computer, the particular layout generation algorithm determined from one or more layout generation algorithms based at least in part on an algorithm identifier maintained by the processing computer, the particular layout generation algorithm different from the first algorithm;

evaluating, by the processing computer, a second digit of the PIN based on the second position and the second server keypad layout; and comparing, by the processing computer, the PIN to a reference PIN.

15. The computer-implemented method of claim 14, further comprising:

determining, by the processing computer, a verification status based on the comparison of the PIN to the reference PIN.

16. The computer-implemented method of claim 14, wherein the first seed value is a public encryption key associated with the processing computer.

17. The computer-implemented method of claim 14, wherein generating the first server keypad layout based on the first seed value comprises using the first seed value as the initial input for a function to produce a pseudo-random result.

\* \* \* \* \*